United States Patent [19]

Effland et al.

[11] Patent Number: 5,008,679
[45] Date of Patent: Apr. 16, 1991

[54] METHOD AND SYSTEM FOR LOCATING AN UNKNOWN TRANSMITTER

[75] Inventors: John E. Effland, Gaithersburg, Md.; John M. Gipson, Silver Spring, Md.; David B. Shaffer, Annapolis, Md.; John C. Webber, Herndon, Va.

[73] Assignee: Interferometrics Incorporated, Vienna, Va.

[21] Appl. No.: 472,837

[22] Filed: Jan. 31, 1990

[51] Int. Cl.5 .................. H04B 7/185; G01S 5/02; G01S 3/02; G01S 1/24
[52] U.S. Cl. .................. 342/353; 342/357; 342/465; 342/387; 342/393
[58] Field of Search ............... 342/353, 357, 387, 450, 342/451, 465, 393

[56] References Cited

U.S. PATENT DOCUMENTS 3,384,891  5/1968  Anderson .................. 342/357
4,888,593  12/1989  Friedman et al. ............. 342/387

OTHER PUBLICATIONS

W. Smith and P. Steffes, IEEE Transactions on Aerospace and Electronic Systems, vol. AES-25, No. 2, pp. 224-230.

P. Chestnut, IEEE Transactions on Aerospace and Electronic Systems, vol. AES-18, No. 2, pp. 214-218.
Spilker, Jr., "GPS Signal Structure and Performance Characteristics", Navigation: Journal of the Instit. of Navigation, vol. 25, No. 2, Summer 1978.

Primary Examiner—Gregory C. Issing

[57] ABSTRACT

The method of locating an unknown radio-frequency transmitter includes: (a) receipt of signals radiated from the transmitter by a plurality of receivers; (b) retransmission of the received signals to a plurality of antennas; (c) performing a time difference of arrival (TDOA) calculation which compensates for a relative delay value, which is a function of the distances from the transmitter to each of the receivers, the distances from each of the receivers to the antennas, and the speed of light; (d) performing a frequency difference of arrival (FDOA) calculation which compensates for a relative frequency value, which is a function of the relative velocity of each receiver with respect to the velocity of the Earth; (e) repeating these steps a plurality of times; and (f) determining the location of the unknown transmitter based on the plurality of TDOA and FDOA calculations.

21 Claims, 7 Drawing Sheets

METHOD AND SYSTEM FOR LOCATING AN UNKNOWN TRANSMITTER

BACKGROUND OF THE INVENTION

The present invention relates to a method of locating an unknown radio-frequency transmitter by remote and passive interferometric observations.

It has been difficult to determine the locations of unknown transmitters which serve as sources of interference to geosynchronous satellite communications systems because of the wide range of potential locations of the interfering transmitters.

One technique which has been used is a time difference of arrival calculation (TDOA) by which the propagation time for the signal uplinked from the unknown transmitter through a particular satellite to a receiving station is compared with that through a neighboring satellite. The signal from the unknown transmitter propagates along different paths to the two satellites and arrives after a delay which is different for the two paths because of their unequal length. Given that the position of the two satellites relative to a receiving station is known, the difference in time of arrival over the two different paths will serve to localize the unknown transmitter location to a curve on the surface of the Earth. This curve is called a delay line of position (LOP) which is the intersection of a hyperbola of revolution with the surface of the Earth. For a typical case of two neighboring geosynchronous satellites, the lines of position of constant time difference value (that is, isodelays) are slightly curved lines running roughly North-South. The exact value of the observed delay depends on the precise geometry including the locations of the two satellites, atmospheric propagation, and instrumental delays in the satellite transponders and the receiving station equipment. Realization of a TDOA measurement requires a two-antenna receiving station capable of accurately estimating the differential delay between the two paths. A LOP determined by TDOA measurements is useful but not sufficient to accurately pinpoint the location of the unknown transmitter since the TDOA measurement localizes the position of the unknown transmitter to only a LOP on the surface of the Earth.

Some additional technique is needed to locate more accurately the unknown transmitter in order to locate the source of interfering signals which disrupt satellite communications systems.

Additionally, a technique is needed to enhance the accuracy of the initial measurements.

SUMMARY OF THE INVENTION

It is therefore an object of the present invention to provide a method for more accurately locating an unknown transmitter.

It is a further object of the invention to provide a method for calibrating the initial measurements in order to enhance their accuracy.

It is an additional object of the invention to provide a method for accurately locating an unknown transmitter even when the signal from the transmitter is invisible in one or both of the channels at the receiving station.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the method of this invention of locating an unknown radio-frequency transmitter by remote and passive observation, comprises the steps of (a) receiving a signal radiated from the unknown radio-frequency transmitter into space, a plurality of receivers at different locations receiving the radiated signal; (b) retransmitting, from each of the plurality of receivers, the signal radiated from the to a plurality of antennas, each at a known location, one of each of the antennas receiving the retransmitted signal from one of the receivers, each of the received retransmitted distance between the transmitter and one of the receivers distance between the one of the receivers and the one of the and by a second path length equal to a distance between one of the receivers and one of the antennas; (c) receiving the retransmitted signals by the antennas; (d) converting the received retransmitted signals to a plurality of digital signals; (e) performing predetection cross-correlation on the plurality of digital signals to obtain a set of data from which a time difference of arrival calculation and a frequency difference of arrival calculation can be made; (f) performing the time difference of arrival calculation which compensates for a relative delay value in the received retransmitted signals from the receivers, the relative delay value being a function of the first path lengths, the second path lengths, and a value equal to the speed of light; (g) performing the frequency difference of arrival calculation which compensates for a relative frequency value in the received retransmitted signals from the receivers, the relative frequency value being related to a difference between a first relative velocity of the one of the receivers with respect to the velocity of Earth and a second relative velocity of the another of the receivers with respect to the velocity of Earth; (h) repeating each of the prior steps a plurality of times; and (i) determining the location of the transmitter by generating isodelay lines of position based on a plurality of the time difference of arrival calculations by generating isodoppler lines of position based on a plurality of the frequency difference of arrival calculations, and locating the intersections of paired, generated isodelay and isodoppler lines of position, the intersections defining a region in which the transmitter is located.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENT

Figure 1:
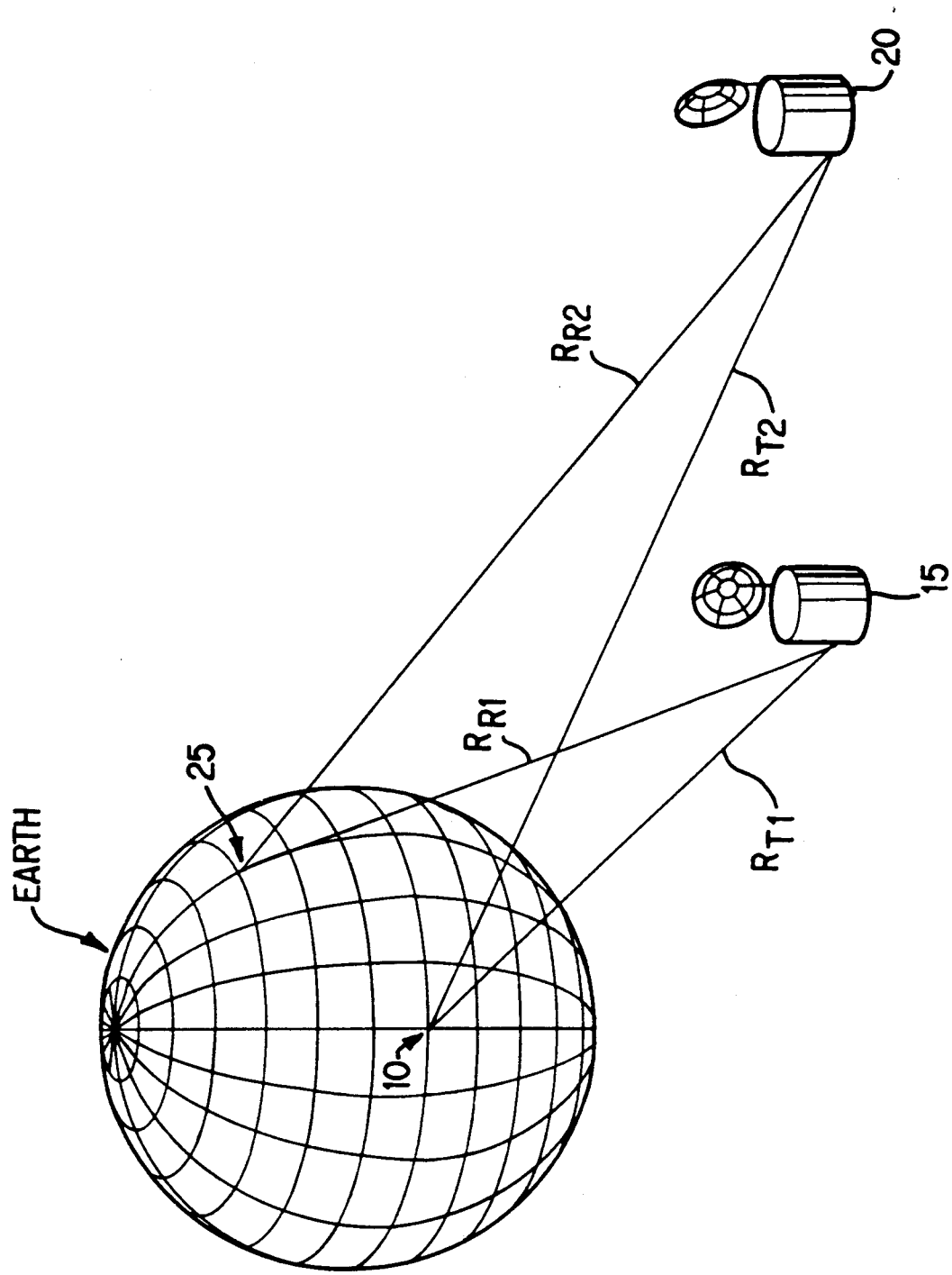
FIG. 1 is an illustration of certain elements used in the preferred embodiment of the invention.

Reference will now be made in detail to the present preferred embodiment of the invention, an example of which is illustrated in the accompanying drawings in which like reference characters refer to corresponding elements.

In accordance with the present invention, the method of locating an unknown radio-frequency transmitter by remote and passive observation begins with the step of receiving, at a plurality of receivers at different locations, a plurality of signals radiated from the unknown radio-frequency transmitter into space at a certain frequency. As illustrated in FIG. 1, an unknown radio-frequency transmitter 10 is located at some unknown location on Earth. A plurality of receivers are shown as satellite 15 and satellite 20. Transponders on board satellites 15 and 20 receive signals radiated from transmitter 10.

Typically, transmitters, such as, transmitter 10, cannot radiate all of their energy in one desired direction but usually have sidelobes which radiate some energy in all directions. The method of the invention makes use of this fact. Here, transmitter 10 aims its main beam at satellite 15, which is geosynchronous to it. However, a small amount of energy is also radiated by sidelobes to neighboring satellite 20.

It should be noted that the preferred embodiment of the invention illustrated makes use of two satellites 15 and 20 to receive signals radiated from the unknown transmitter 10. However, the invention is equally applicable for receivers other than satellites, which could include airborne receivers on airplanes or ground-based receivers which are in motion with respect to each other. Additionally, the invention may also be used when both receivers receive only sidelobe radiation or when the receivers are not in geosynchronous orbit.

In accordance with the invention, the next step in the method of the present invention includes retransmitting, from each of the plurality of receivers, the plurality of signals radiated from the unknown radio-frequency transmitter at a frequency different from the certain frequency to a plurality of antennas at a known location. One of each of the antennas receives retransmitted signals from one of the receivers which received retransmitted distance between the transmitter and one of the receivers and by a second path length equal to a distance between that one of the receivers and one of the antennas received retransmitted signals are transmitted from each receiver at different frequencies.

As illustrated in FIG. 1, satellite 15 and satellite 20 each retransmit signals which were radiated from transmitter 10 to receiving station 25, located at a known position on Earth. The signals may be retransmitted in the RF band 3.7 to 4.2 gigahertz GHz, 11.7 to 12.2 GHz, or another predetermined frequency band. Receiving station 25 includes at least two antennas, one aimed at one of the satellites and the other aimed at the second satellite in order to receive signals from the satellites.

The particular signal from transmitter 10 propagates along different paths to the two satellites 15 and 20 and arrives at receiving station 25 after a delay which is different for the two paths because of their unequal length.

The signal originating from transmitter 10 and retransmitted by satellite 15 to receiving station 25 is delayed by a first path length equal to a distance between transmitter 10 and satellite 15, $R_{T1}$, and by a second path length equal to a distance between satellite 15 and receiving station 25, $R_{R1}$. The signal originating from transmitter 10 and retransmitted from satellite 20 to receiving station 25 is delayed by a first path length equal to a distance between transmitter 10 and satellite 20, $R_{T2}$, and by a second path length equal to a distance between satellite 20 and receiving station 25, $R_{R2}$.

The received signal will be strong in satellite 15, that is the satellite in the main beam from transmitter 10, and will probably be so weak as to be individually undetectable in the adjacent satellite 20. In order to determine the signal received by satellite 20, that is, the sidelobe, which may be more than 40 dB below the system noise in satellite 20, a pre-detection correlation technique is used in the invention. Since the satellite transponders operate independently, the main beam and sidelobe signals retransmitted from satellites 15, 20, respectively, are retransmitted at different frequencies. Thus, the signals arrive at receiving station 25 not only at different times because of different delays but also at different frequencies. Furthermore, since the satellites are not perfectly stationary with respect to Earth, but perform station-keeping only to within some prescribed tolerance, both the relative delay (due to the instantaneous geometry between the transmitter, the satellites, and the receiving station) and the relative frequency (due to the Doppler shift caused by the relative velocity of the satellites) will change with time. The detection of the relative delay is called the time difference of arrival (TDOA) and the detection of the relative frequency is called the frequency difference of arrival (FDOA), both of which are utilized in the invention to determine the location of the transmitter. Specifically, TDOA data and FDOA data are used to determine the isodelays and isodopplers (lines of constant frequency difference), respectively, and the intersection of the isodelay and isodoppler lines of position identify the location of the transmitter.

Figure 2:
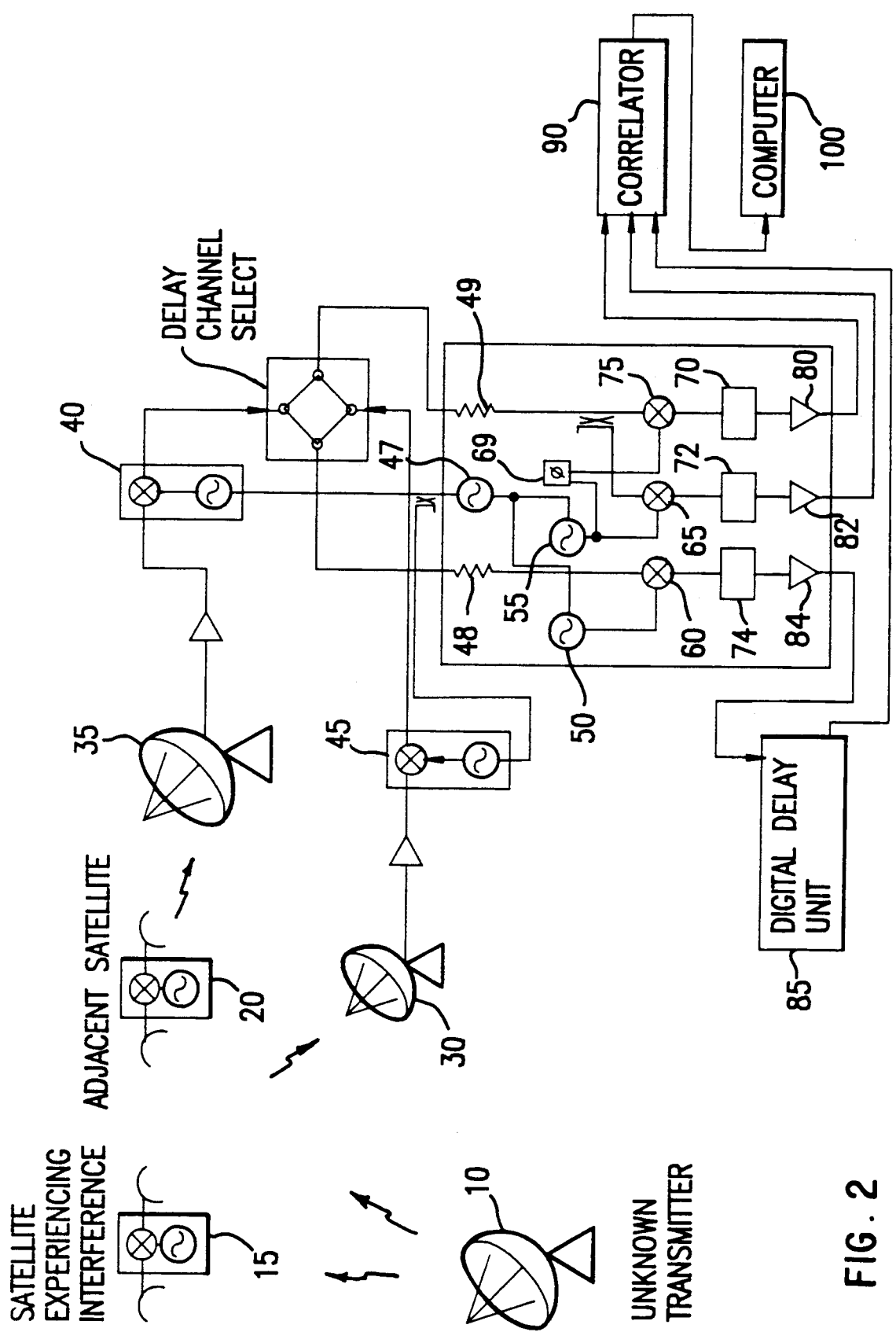
FIG. 2 is a diagram illustrating the major elements used in the preferred embodiment of the invention.

The equipment included at receiving station 25 is shown in FIG. 2. Antenna 30, which is pointed to satellite 15, receives the retransmitted signals from satellite 15. Antenna 35 receives the retransmitted signals from satellite 20. The received retransmitted signals are then converted to an intermediate frequency using local oscillators and mixers 40 and 45. Oscillators and mixers 40 and 45 are phase-locked to a common precision frequency standard 47 if antennas 30 and 35 are not widely separated or to separate frequency standards if the antennas are widely separated. Oscillators and mixers 40 and 45 must be sufficiently phase stable so that the signals can be coherently downconverted even after up to 1.2 milliseconds relative delay of the received retransmitted signals. The presently preferred intermediate frequency band is 500 to 1000 MHz, which serves to provide sufficient bandwidth to cover the common communication bands of interest and is low enough to be easily transmitted through an ordinary coaxial cable.

The intermediate frequency signals are then coherently downconverted to baseband by phase-locked local oscillators (LO) 50 and 55. The intermediate frequency signal is mixed with local oscillator signal in single sideband mixers 60 and 65 which provide image rejection of at least 22 dB. Either the upper or lower sideband output may be used, but it must be the same for each channel. Programmable attenuators 48 and 49 maintain an acceptable input power level to mixers 60 and 65. Quadrature channel 75 is provided for one of the signals so that three phase-coherent baseband channels are present. These signals are then filtered by programmable filters 70, 72 and 74, which are low-pass filters, to confine the signals to a band of interest. The band of interest may be a total bandwidth of a few kilohertz to several megahertz depending on the nature of the signal.

The individual signals including quadrature channel 75, which is converted by the equivalent of a local oscillator offset by $\pi/2$ radians, for one signal path (transmitter 10 to one satellite to one antenna) are then sampled in high-stability, high-speed analog-to-digital converters 80, 82 and 84 which may perform the conversion using one-bit or multi-bit sampling. A 4-bit scheme is currently preferred since it provides a good compromise between the signal-to-noise ratio loss, which would occur if using only 2-bit sampling, and the complexity of higher-level sampling. The sampling is performed at a rate which is, at a minimum, the Nyquist rate or twice the frequency of the bandwidth of the input signal. The presently preferred rate of sampling is 32 MHz. However, other rates may be used.

In order to compensate for the relative geometric delay, the signal from one signal path (transmitter 10 to one satellite to one antenna that is, one first path length and its corresponding second path length) is input to digital delay unit 85 and is output with a delay of up to 700 milliseconds, depending on the particular satellite geometry involved. Digital delay unit 85 is comprised of a first-in, first-out memory. The delay used is selectable and may be applied to the signal from either intermediate frequency channel. The delayed signal is then input with the digital signal from the other signal path and the converted quadrature channel signal to correlator 90.

In accordance with the invention, the method further includes the step of performing a time difference of arrival calculation which compensates for a relative delay value in the received retransmitted signals from the receivers, the relative delay value being a function of the first path lengths ($R_{T1}$, $R_{T2}$ in the preferred embodiment), the second path lengths ($R_{R1}$, $R_{R2}$), and a value equal to the speed of light.

Figure 3:
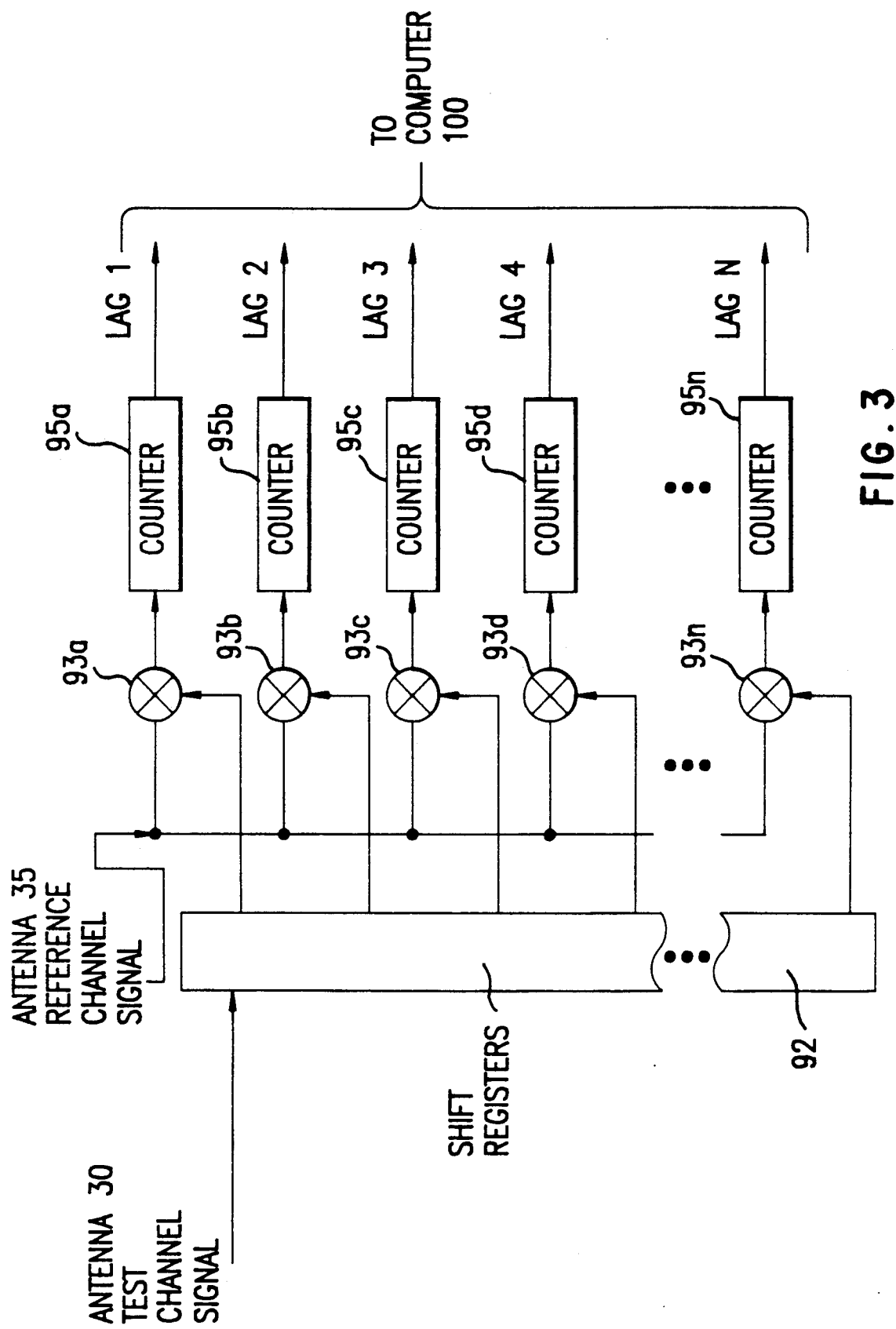
FIG. 3 is a diagram illustrating a preferred embodiment of the correlator shown in FIG. 2.

As embodied herein, correlator 90 is shown in greater detail in FIG. 3. The present embodiment of correlator 90 is comprised of a special CMOS gate array designed for cross-correlation of signals in radio astronomy. The correlator includes 16 channels of two-bit multipliers, counters, and readout registers. Each channel's counter is 24 bits wide, but only the most significant 16 bits are accessible. Correlator 90 is capable of operating at speeds of up to 50 MHz clock rate. Multiple correlators 90 may be used in series, each correlator 90 passing the bits through its shift register to the next correlator 90 creating multiple delay channels.

One signal being received is sampled and then input to chained shift registers 92. The output from registers 92 is then applied to all two-bit multipliers $93a$ to $93n$ simultaneously. For each delay channel, a different sample, that is the signal received by another antenna delayed by one sample period, is applied to each multiplier $93a$ to $93n$ simultaneously with the test channel signal. The output of multipliers $93a$ to $93n$ is input to summation circuitry, consisting of 24-bit counters $95a$ to $95_n$. The output of each counter $95a$ to $95n$ is proportional to the strength of the cross-correlation for a particular relative delay.

By using a plurality of delays, or correlation channels, a large range of relative delays can be measured simultaneously. For example, if the test channel signal bandwidth is 1 MHz, then the sampling frequency is set to 2 MHz or 0.5 microseconds per sample. In order to measure transmissions from the entire continental U.S., about 2400 simultaneous observations of delay channels are required. If this many channels are available, then every transmitter on the continental U.S., which is transmitting to the satellites being observed within the received frequency band, will be detected simultaneously, each at its own delay and frequency offset. However, for fastest determination of a transmitter location, the number of channels should be set so that the entire delay span of interest can be covered with a bandwidth which matches the signal from the transmitter. In this embodiment, the delay span is covered by dividing the span into several segments and observing each in turn. This method takes longer than performing simultaneous observations but permits use of a relatively inexpensive computer 100 for data processing.

In order to achieve the maximum possible signal-to-noise ratio (SNR), it is necessary that a quadrature channel for one of the two retransmitted signals also be cross-correlated in correlator 90. This is accomplished by using three intermediate frequency-to-baseband conversion channels, instead of two. For two of the channels, the same input signal is applied to mixers 60 and 65, shown in FIG. 2, but one output of local oscillator 55 is delayed by phase shifter 69 and is different in phase with respect to the other by $\pi/2$ radians. The cross-correlation performed by correlator 90 thus requires a second set of shift registers, multipliers and counters which results in two different cross-correlations which are statistically independent, increasing the SNR by a factor of 1.4. The cross-correlation is performed a plurality of times.

In accordance with the invention, the method of locating the unknown transmitter further includes the step of performing a frequency difference of arrival calculation which compensates for a relative frequency value in the received retransmitted signals from the receivers, the relative frequency value being related to a difference between a first relative velocity of one of the receivers with respect to a velocity of Earth and a second relative velocity of another of the receivers with respect to the velocity of Earth.

As embodied herein, in order to compensate for the different relative frequency values or gross offsets between the received retransmitted signals from satellites 15 and 20 due to having different transponders on board satellites 15 and 20 which each would experience some fringe rate jitter due to drift, the local oscillator for one baseband conversion channel may be offset by a corresponding amount in order to make the frequencies of both baseband signals approximately the same. A remaining residual frequency offset, due to the movement of the satellites relative to the velocity of Earth, will change with time and constitutes the observable value for the FDOA. In order to determine the value of the gross offset, a predetermined signal, which can be easily identified when received by both satellites 15 and 20, can be transmitted to satellites 15 and 20 from a known location on the ground. The gross offsets for each satellite should be relatively stable with time and need to be determined only once for a given pair of satellites. In other situations, continuous calibration is required.

The remaining or residual frequency offset may be chosen to be a value close to zero, typically a rate of a few hertz. In order to measure this offset properly, it is necessary to read the outputs of counters 95a to 95n at least twice as often as the value of the residual frequency offset, typically at a rate of 20 Hz.

Using 1024 delay channels (2048 correlator channels when including quadrature correlation), produces 81,920 bytes per second for 20 counter readings per second. The satellite transponder frequency stabilities are such that a typical coherent observation time may be about 30 seconds, thus a single observation consists of about 2.56 Mbytes of data.

It should be noted that it is also possible to remove the gross frequency offset by using digital mixing instead of offsetting one of the local oscillators. This digital mixing method requires multiplying one of the channels by a value equal to a digital approximation to a sine wave at the expected gross frequency offset value. This multiplication is performed prior to the cross-correlation. However, it results in a slight degradation of the SNR.

Figure 4:
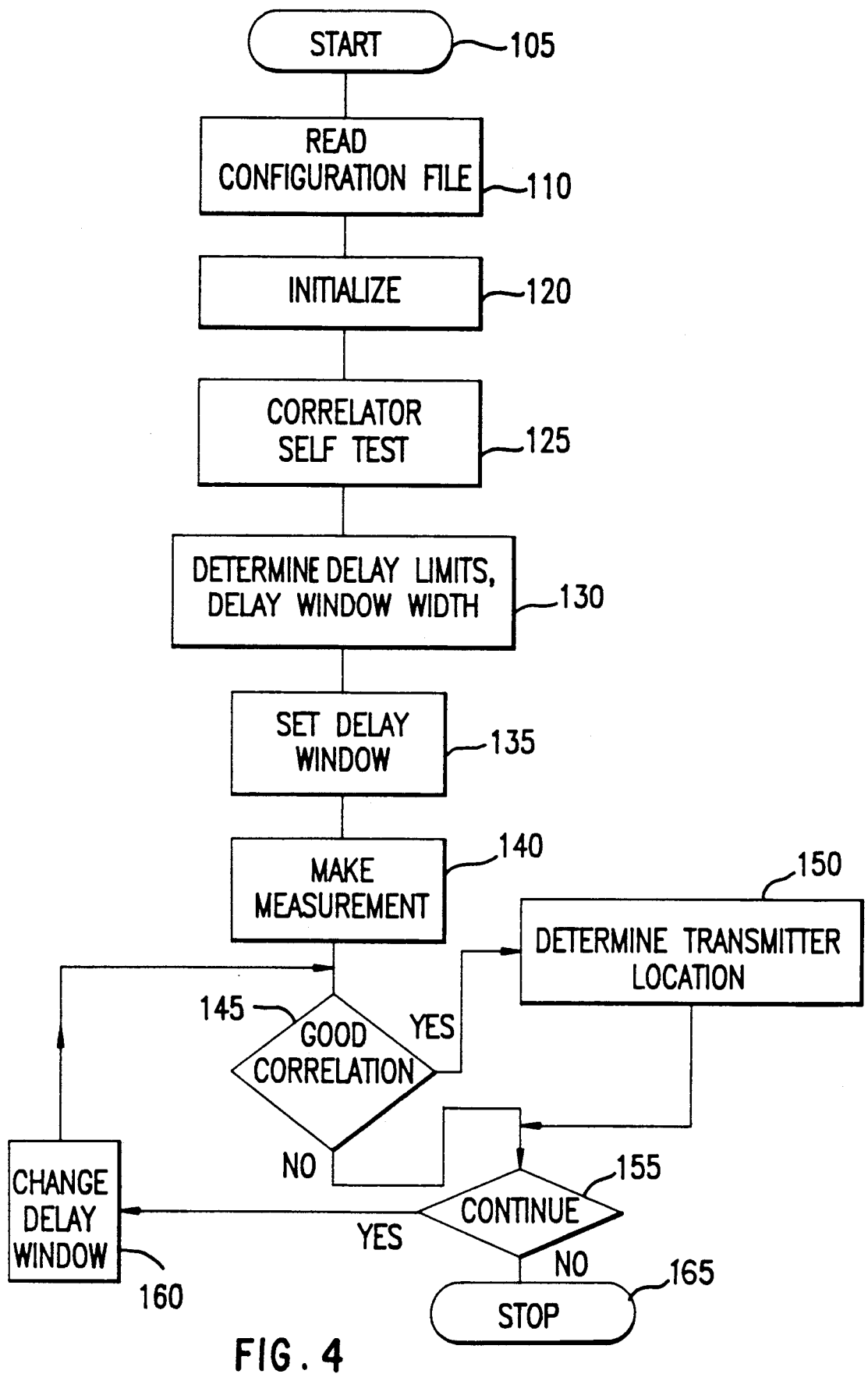
FIG. 4 is a flow chart illustrating the method of determining the unknown transmitter location by using time difference of arrival calculations and frequency difference of arrival calculations in accordance with the preferred embodiment of the invention.

In accordance with the invention, the method of locating the unknown transmitter further includes the step of determining a location of the unknown transmitter based on a plurality of the time difference of arrival calculations and a plurality of the frequency difference of arrival calculations. As embodied herein, and as shown in FIGS. 2 and 3, the results of the cross-correlation are output from correlator 90 to computer 100. Computer 100 is preferably an 80386 processor. Computer 100 analyzes the results as shown in FIGS. 4 to 7. Computer 100 recognizes the target signal, or the signal transmitted by transmitter 10, by the presence of a peak in the cross-correlation results. This peak will vary in amplitude and phase, so the easiest way to measure it accurately is to perform a one-dimensional Fourier transform (FFT) in the time dimension and search for the peak in the transformed space. This Fourier transform is done using an array processor for the sake of speed, so that the FFT may be performed while the next set of data is being obtained. For each observation, a value is produced for both the time delay and frequency offset, that is, for both TDOA and FDOA. The overall architecture for the main program the computer utilizes is shown in FIG. 4.

As shown in FIG. 4, the program starts at step 105. Steps 110 to 125 relate to certain initialization routines which are performed prior to the analysis. At step 130, the computer sets the known limits for time delay and frequency offset. At step 135, a window within which the actual values for delays to be measured may occur is determined. Next, at step 140, the program calls the make measurement subroutine.

Figure 5:
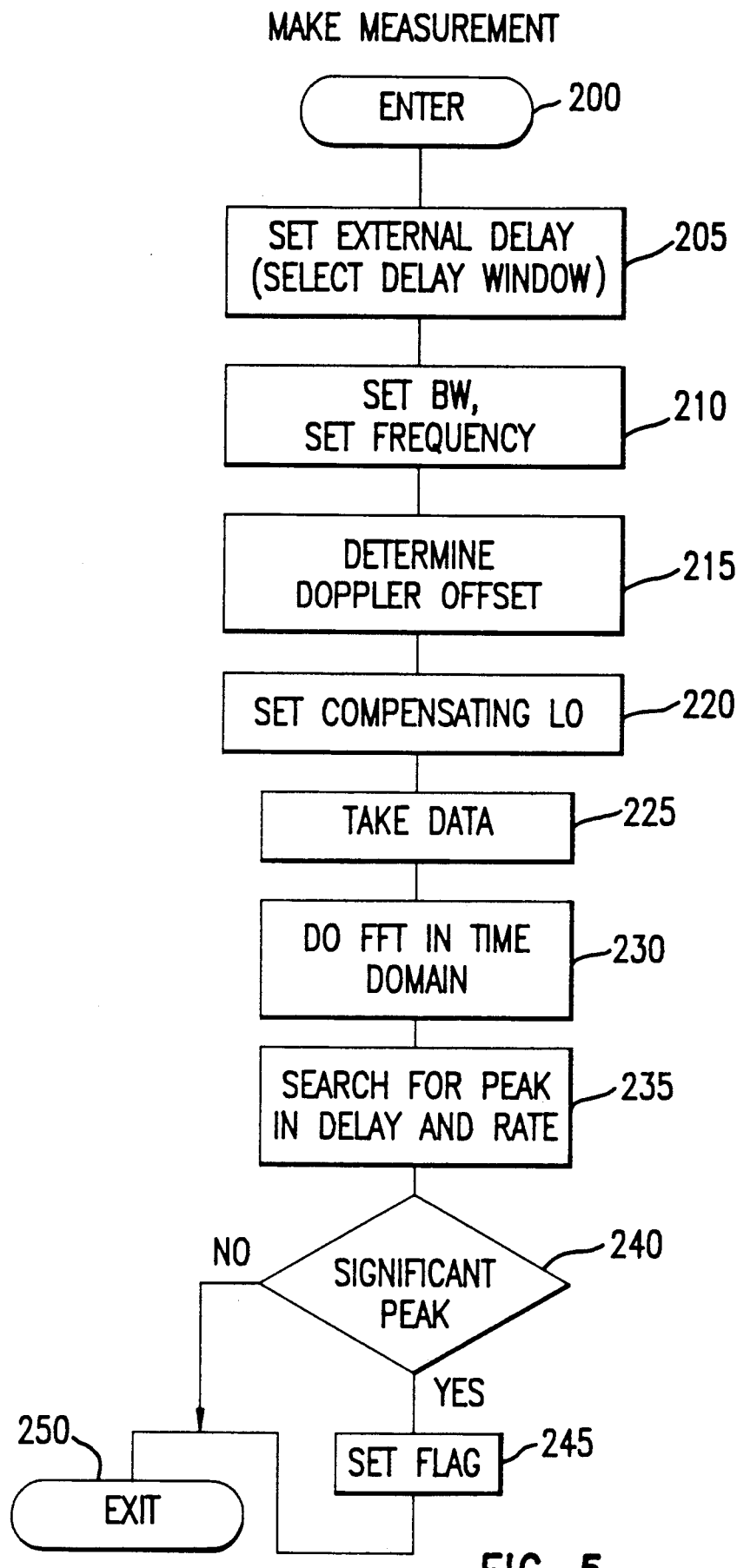
FIG. 5 is a flow chart illustrating the preferred embodiment of the make measurement subroutine of FIG. 4.

The make measurement subroutine is shown in FIG. 5. The program enters the subroutine at step 200. The subroutine sets a delay offset, creating a window within which the delay values may occur at step 205. Next, at step 210, values for bandwidth and frequency of correlator 90 are set. At step 215, the residual frequency offset, or Doppler offset, is determined to compensate for satellite offset. The gross offset frequency value for the local oscillator is set at step 220. Then, at step 225, the results from correlator 90 are taken. The subroutine then performs the Fourier transform on the data at step 230. The results of the FFT are analyzed for peaks in delay and rate at step 235. If there is a significant peak, determined at step 240, the subroutine sets a flag at step 245 and then exits from the routine at step 250. If there is no significant peak at step 240, the routine goes to step 250 and exits from the routine.

After exiting from the make measurement routine, the main program in FIG. 4 uses the results of the make measurement routine to determine if the results input to the computer 100 from correlator 90 were good. That is, if a significant peak was found, the cross-correlation was good. If the results were good, the location of the unknown transmitter can be determined at step 150 where the determine transmitter location subroutine is called by the main program.

Figure 6:
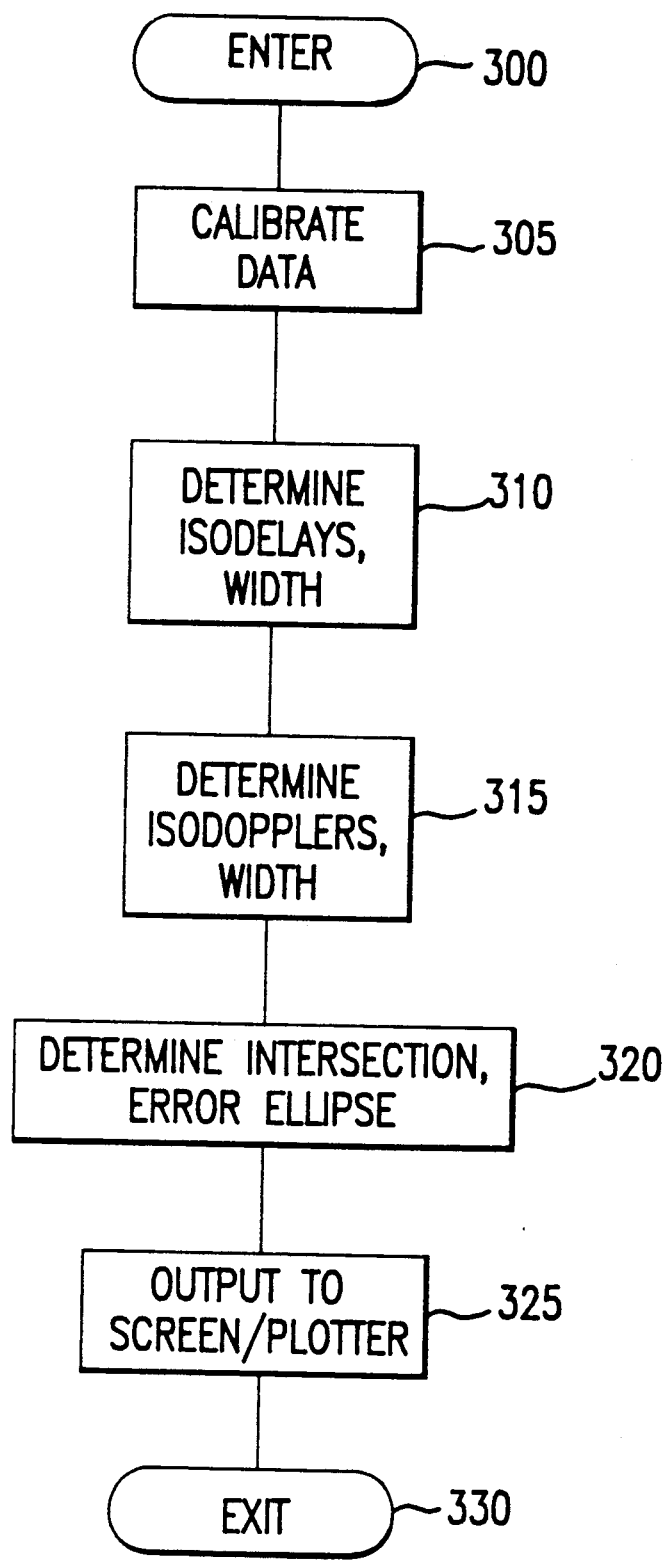
FIG. 6 is a flow chart illustrating the preferred embodiment of the determine transmitter location subroutine of FIG. 4.
Figure 7:
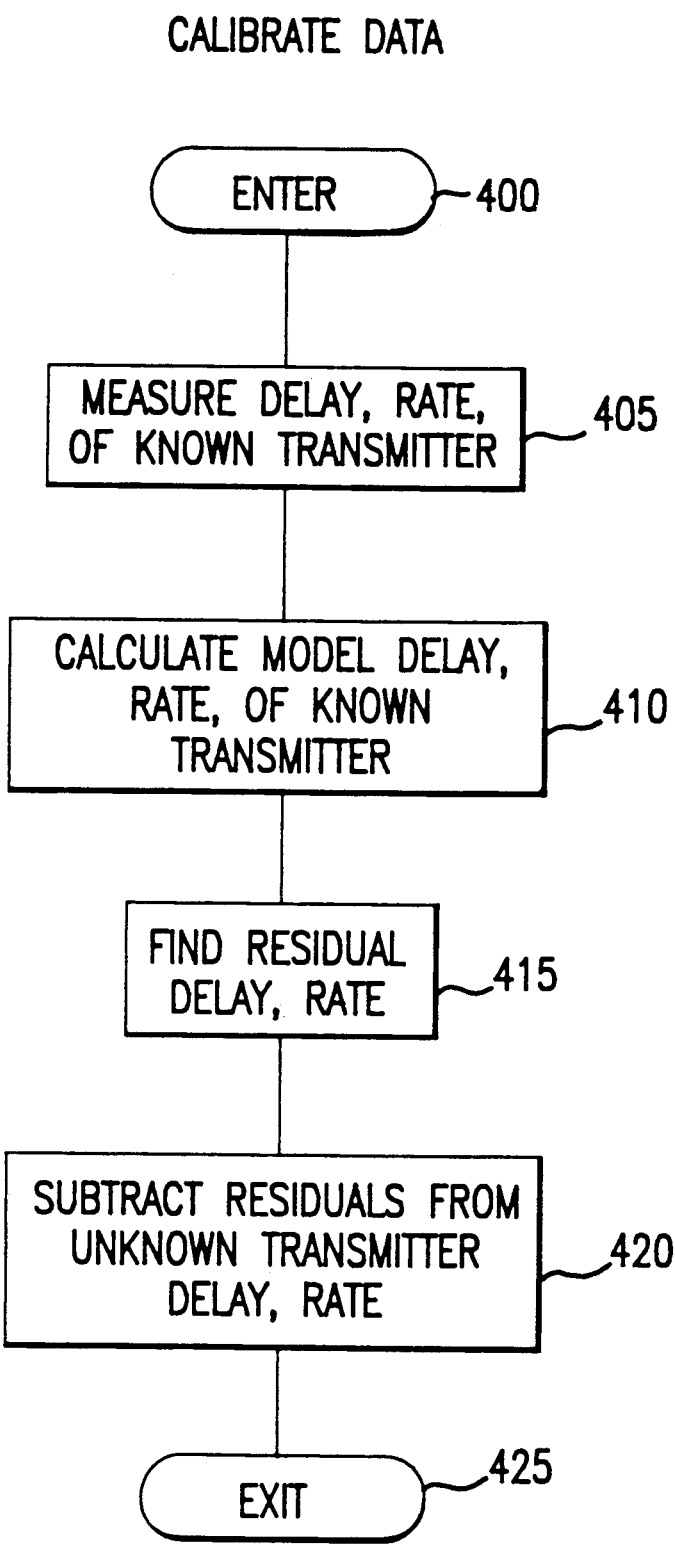
FIG. 7 is a flow chart illustrating the preferred embodiment of the calibrate data subroutine of FIG. 6.

The determine transmitter location subroutine is illustrated in FIG. 6. The program enters the routine at step 300. Then, at step 305, the calibrate data subroutine is called. The calibrate data subroutine is illustrated in FIG. 7. This routine is necessary because both TDOA and FDOA will change with time as the satellites move with respect to Earth and with respect to each other. There will also be changes caused by instrumental effects, such as instability of the transponders aboard satellites 15 and 20. In order to calibrate these effects in real time, it is desirable to observe additional known transmitters simultaneously with the observation of the unknown transmitter 10. This calibration will serve to enhance the accuracy of the measurements.

Since there may be no other transmitters operating within the band observed, it may be necessary for calibration purposes to switch rapidly from one observing band to another, still using the same transponder on board one of the satellites. An alternative is to use an additional set of baseband converters. Once the approximate TDOA and FDOA of the target signal have been identified, only a small range of correlator channels is needed for analyzing the target signal. Unused correlator channels may be assigned to use as calibrator channels for observing other transmitters at the same or different frequencies.

Thus, upon entering the calibrate data subroutine, the program goes to step 400. Then, the delay and rate of a known transmitter are measured at step 405. Next, at step 410, a model delay and rate of the known transmitter are calculated. The residual delay and rate are then determined at step 415. The determined residual delay and rate are subtracted from the delay and rate of the unknown transmitter at step 420. The program then exits from the calibrate data subroutine at step 425 and returns to the determine transmitter location subroutine at step 310. At step 310, the isodelays (lines of position of constant time difference value) are determined from the TDOA calculations. Then, at step 315, the isodopplers (lines of constant frequency difference) are determined from the TDOA calculations. At step 320, the intersection of the isodelay and isodoppler lines of position are determined. There are a plurality of lines of position determined since, as the positions of satellites 15 and 20 change, different lines of position are generated with respect to the surface of the Earth. The intersection of the lines of position define a region in which unknown transmitter 10 must lie. The latitude and longitude of this region may then be calculated. The size of this region depends on the accuracy of the lines of position and on the geometry of the particular situation. Depending on the geometry, a few minutes to several hours of observations may be needed in order to locate the unknown transmitter 10 to desired accuracy. With good calibration, the unknown transmitter 10 may be located to within one mile or better. The intersection information is output to a screen and plotter at step 325 which uses a reference map database to produce a display of the unknown transmitter 10 location. In the case of transmitters which are intentionally or accidentally interfering with satellite communications, this accuracy is sufficient to permit a ground search to locate the transmitter 10 and silence it.

The program exits the determine transmitter location subroutine at step 330 and returns to the main program at step 155 and continues if the transmitter location was not determined precisely enough at step 160 where the delay window is changed. Or, if the transmitter location has been determined, the program is stopped at step 165.

As can be appreciated, the method of the present invention is an improvement over past methods because of the use of pre-detection correlation for the maximum possible sensitivity and accuracy. Additionally, the calibration of the satellite transponder frequency drifts in real time by simultaneous observation of transmitters of known location also enhances the accuracy of the determination of location. The ability to combine intersections of lines of position obtained with TDOA and FDOA measurements makes possible the location of unknown transmitters to an unprecedented accuracy.

It will be apparent to those skilled in the art that various modifications and variations can be made in the method and apparatus of the present invention without departing from the scope or spirit of the invention. Thus, it is intended that the present invention cover the modifications and variations of this invention provided they come within the scope of the appended claims and their equivalents.

What is claimed is:

1. A method of locating an unknown radio-frequency transmitter by remote and passive observation, comprising the steps of:
   (a) receiving a signal radiated from the transmitter into space, a plurality of receivers at different locations receiving the radiated signal;
   (b) retransmitting, from each of the plurality of receivers, the signal radiated from the transmitter to a plurality of antennas, each at a known location, one of each of the antennas receiving the retransmtited signal from one of the receivers, each of the received retransmitted signals being delayed by a first path length equal to a distance between the transmitter and one of the receivers and by a second path length equal to a distance between one of the receivers and one of the antennas;
   (c) receiving the retransmitted signals by the antennas;
   (d) converting the received retransmitted signals to a plurality of digital signals;
   (e) performing pre-detection cross-correlation on the plurality of digital signals to obtain a set of data from which a time difference of arrival calculation and a frequency difference of arrival calculation can be made;
   (f) performing the time difference of arrival calculation which compensates for a relative delay value in the received retransmitted signals from the receivers, the relative delay value being a function of the first path lengths, the second path lengths, and a value equal to the speed of light;
   (g) performing the frequency difference of arrival calculation which compensates for a relative frequency value in the received retransmitted signals from the receivers, the relative frequency value being related to a difference between a first relative velocity of one of the receivers with respect to the velocity of Earth and a second relative velocity of another of the receivers with respect to the velocity of Earth;
   (h) repeating each of the prior steps a plurality of times; and
   (i) determining the location of the transmitter by generating isodelay lines of position based on a plurality of the time difference of arrival calculations, by generating isodoppler lines of position based on a plurality of the frequency difference of arrival calculations, and locating the intersections of paired, generated isodelay and isodoppler lines of position, the intersections defining a region in which the transmitter is located.

2. The method of claim 1 further including, subsequent to the step of receiving the retransmitted signals, the steps of:
   (a) converting the received retransmitted signals to a plurality of common intermediate frequency signals;
   (b) downconverting the intermediate frequency signals to a baseband value; and
   (c) sampling the downconverted signals, 3. The method of claim 1 wherein the step of receiving the radiated signals from the transmitter is performed by a first transponder including a first local oscillator on one of the receivers and a second transponder including a second local oscillator on another of the receivers.

4. The method of claim 2 wherein the step of converting the received retransmitted signals uses a plurality of third local oscillators, the third local oscillators being phased-locked to a common intermediate frequency value.

5. The method of claim 2 wherein the step of converting the received retransmitted signals uses a plurality of third local oscillators, the third local oscillators being phase-locked to a separate frequency value.

6. The method of claim 2 wherein the step of downconverting uses a plurality of fourth local oscillators, the fourth local oscillators being phase-locked.

7. The method of claim 2, further comprising the step of filtering the downconverted signals prior to the sampling step, the filtering confining the downconverted signals to a predetermined frequency band of interest.

8. The method of claim 2 wherein the sampling step uses an analog-to-digital converter which converts the downconverted signals to digital signals using a one-bit sampling technique, the sampling being performed at a rate equal to or greater than twice the frequency of the bandwidth of the sampled signal 9. The method of claim 2 wherein the sampling step uses an analog-to-digital converter which converts the downconverted signals to digital signals using a multi-bit sampling technique, the sampling being performed at a rate equal to or greater than twice the frequency of the bandwidth of the sampled signal.

10. The method of claim 2 wherein the pre-detection cross-correlation step includes the steps of:
(a) performing a Fourier transform of the obtained set of data to obtain a resultant set; and
(b) searching the resultant set for peaks to obtain the relative delay value and the relative frequency value of the received retransmitted signals for further processing in the time difference of arrival and frequency difference of arrival calculations.

11. The method of claim 10 wherein the pre-detection cross-correlation includes the steps of
(a) applying the sampled signal to each of a plurality of multipliers simultaneously;
(b) applying a different sampled signal, the different sampled signal being delayed by one sample period, to each multiplier simultaneously with the sampled signal;
(c) multiplying the sampled signal by the different sampled signal for each of the multipliers to obtain a plurality of products; and
(d) summing the plurality of products to obtain a plurality of values proportional to a plurality of the relative delay values.

12. The method of claim 11 wherein the summing step uses a plurality of counters.

13. The method of claim 11 further comprising the step of obtaining a maximum value for a signal-to-noise ratio simultaneously with the downconverting step.

14. The method of claim 13 wherein the step of obtaining a maximum value of signal-to-noise ratio includes the steps of:
(a) downconverting the received retransmitted signal from one of the receivers to two quadrature baseband values; and
(b) cross-correlation the two baseband values against a single-baseband value from a different receiver.

15. The method of claim 1 wherein the step of performing the frequency difference of arrival calculation includes the steps of:
(a) transmitting a known signal from a known transmitter to each of the receivers, relaying the known signal from the receivers to the antennas, and receiving the known signal by the antennas;
(b) determining the frequency offset value for each of the receivers based on the difference in frequency between the known signal and the retransmitted signal; and
(c) using the offset values to adjust the frequencies of the baseband values to be the same.

16. The method of claim 2 wherein the step of performing the frequency difference of arrival calculation includes the step of:
multiplying one of the baseband values by a digital value which approximates a sine wave.

17. A method of locating an unknown ground-based radio-frequency transmitter by remote and passive observation from space, comprising the steps of:
(a) receiving a signal radiated from the transmitter into space, a plurality of satellites receiving the radiated signal;
(b) retransmitted from each of the plurality of satellites, the signal radiated from the transmitter to a plurality of ground-based antennas, each at a known location, one of each of the antennas receiving the retransmitted signal from one of the satellites, the received retransmitted signals being delayed by a first path length equal to a distance between the transmitter and one of the satellites and by a second path length equal to a distance between one of the satellites and one of the antennas;
(c) receiving the retransmitted signals by the antennas;
(d) converting the received retransmitted signals to a plurality of common intermediate frequency signals;
(e) downconverting the intermediate frequency signals to a baseband value;
(f) sampling the downconverted signals;
(g) converting the downconverted signals to a plurality of digital signals;
(h) performing pre-detection cross-correlation on the plurality of digital signals to obtain a set of data from which a time difference of arrival calculation and a frequency difference of arrival calculation can be made;
(i) performing the time difference of arrival calculation which compensates for a relative delay value in the received retransmitted signals from the satellites, the relative delay value being a function of the first path lengths, the second path lengths, and a value equal to the speed of light;
(j) performing the frequency difference of arrival calculation which compensates for a relative frequency value in the received retransmitted signals from the satellites, the relative frequency value being related to a difference between a first relative velocity of one of the satellites with respect to the velocity of Earth and a second relative velocity of another of the satellites with respect to the velocity of Earth;
(k) repeating each of the prior steps a plurality of times; and
(l) determining the location of the transmitter by generating isodelay lines of position based on a plurality of the time difference of arrival calculations, by generating isodoppler lines of position based on a plurality of the frequency difference of arrival calculations, and locating the intersection of the paired, generated isodelay and isodoppler lines of position to define a region in which the transmitter is located.

18. The method of claim 1 further including the step of calibrating data in real time to correct the effects of the movement of the receivers with respect to Earth and with respect to each other and to correct for the effects of instrument instability to enhance the accuracy of determining the location of the unknown transmitter.

19. The method of claim 18 wherein the calibrating data step includes the steps of:
(a) observing a known transmitter having a known location, concurrently with the observation of the unknown transmitter, by receiving signals originating from the known transmitter that are retransmitted from the receivers to the antennas;
(b) measuring the delay and rate of the received retransmitted signals from the known transmitter;
(c) determining a model delay and rate of the received retransmitted signals from the known transmitter;
(d) determining a residual delay and rate; and
(e) subtracting the residual delay and rate from the delay and rate of the received retransmitted signals from the unknown transmitter.

20. A system for locating an unknown radio-frequency transmitter by remote and passive observation, the unknown transmitter radiating a signal, comprising:
 (a) a plurality of receivers at different locations for receiving the radiated signal and retransmitted the radiated signal to Earth;
 (b) a plurality of antennas, each at known location on Earth, for receiving the retransmitted signals, each of the received retransmitted signals being delayed by a first path length equal to a distance between the transmitter and one of the receivers and by a second path length equal to a distance between one of the receivers and one of the antennas;
 (c) means for performing a pre-detection cross-correlation on the received retransmitted signals to obtain both a relative delay value and a relative frequency value of the received retransmitted signals;
 (d) means for determining the time difference of arrival and the frequency difference of arrival from the relative delay values and the relative frequency values, respectively, obtained from the received retransmitted signals; and
 (e) means for generating an isodelay line of position based on the time difference of arrival determination and an isodoppler line of position based on the frequency difference of arrival, the intersection of the generated lines of position defining the location of the unknown transmitter.

21. The system of claim 20 wherein the receivers include transponders, which transponders have transponder frequency drifts, and wherein the receivers receive signals from a known transmitter having a known location and retransmit the signals to the plurality of antennas, the system further comprising:
 means for calibrating in real time the transponder frequency drifts, by determining the delay and rate of the retransmitted signals from the known transmitter, to enhance the accuracy of determining the location of the unknown transmitter.

* * * * *

UNITED STATES PATENT AND TRADEMARK OFFICE
CERTIFICATE OF CORRECTION

PATENT NO. : 5,008,679

DATED : April 16, 1991

INVENTOR(S) : Effland et al.

It is certified that error appears in the above-identified patent and that said Letters Patent is hereby corrected as shown below:

Claim 2, column 10, line 33: change "signals," to --signals.--.

Claim 8, column 10, line 62: change "signal" to --signal.--.

Claim 17, column 11, line 61: change "retransmitted" to --retransmitting--.

Signed and Sealed this

Twenty-fifth Day of August, 1992

*Attest:*

DOUGLAS B. COMER

*Attesting Officer*   *Acting Commissioner of Patents and Trademarks*